US009682462B2

(12) United States Patent
Wong

(10) Patent No.: US 9,682,462 B2
(45) Date of Patent: Jun. 20, 2017

(54) PUSH-PULL PLIERS WITH HAMMERS

(71) Applicant: Harry Wong, South Pasadena, CA (US)

(72) Inventor: Harry Wong, South Pasadena, CA (US)

(*) Notice: Subject to any disclaimer, the term of this patent is extended or adjusted under 35 U.S.C. 154(b) by 0 days.

(21) Appl. No.: 14/544,649

(22) Filed: Jan. 29, 2015

(65) Prior Publication Data

US 2016/0221132 A1 Aug. 4, 2016

(51) Int. Cl.

| | |
|---|---|
| ***B23P 19/04*** | (2006.01) |
| ***B25B 7/12*** | (2006.01) |
| ***B25B 7/22*** | (2006.01) |
| *B25B 19/00* | (2006.01) |

(52) U.S. Cl.

CPC ................ *B25B 7/12* (2013.01); *B25B 7/123* (2013.01); *B25B 7/22* (2013.01); *B25B 19/00* (2013.01)

(58) Field of Classification Search

USPC .......... 29/254; 81/418, 463, 420; 7/127, 137

See application file for complete search history.

(56) References Cited

U.S. PATENT DOCUMENTS 3,585,704 A * 6/1971 Shroeder ................... B25B 7/02 269/2
3,791,012 A * 2/1974 Jenkin ..................... B25B 27/02 173/91
4,307,635 A * 12/1981 Genova ................... B25B 7/123 29/254
4,669,341 A * 6/1987 Small ........................ B25B 7/02 227/147
7,168,144 B1 * 1/2007 Haelle ..................... B25B 27/02 29/254
D718,107 S * 11/2014 Bascom ........................... D8/52
2013/0154295 A1 * 6/2013 Braswell ............... F41B 5/1465 294/217

* cited by examiner

*Primary Examiner* — Larry E Waggle, Jr.
*Assistant Examiner* — Alvin Grant

(57) ABSTRACT

A push-pull pliers with hammers utilizing the mechanism of conventional vise-grip locking pliers comprises a fixed jaw with threaded hole and hammer head and a slidable hammer assembly attached to either side of the body of the fixed jaw. Gripping a workpiece, such as a cotter pin, a nail, a tube, etc., the slidable hammer assembly can be used to push the workpiece into its base or to pull the workpiece out of its base. The slidable hammer assembly is detachable from the body of the present invention.

6 Claims, 4 Drawing Sheets

PUSH-PULL PLIERS WITH HAMMERS

REFERENCE CITED

U. S. Patent Documents

| | | |
|---|---|---|
| 3,791,012 | February 1974 | Jenkin |
| 4,307,635 | December 1981 | Genova |
| 4,669,341 | June 1987 | Small |
| 5,984,272 | November 1999 | Crider |
| 7,168,144 | January 2007 | Haelle |
| 8,407,874 | April 2013 | Gilberti |

BACKGROUND OF THE INVENTION

1. Field of the Invention

The present invention relates to a class of locking pliers, or vise grips in general, and more particularly to a push-pull pliers with hammers equipped with a removable sliding hammer assembly for pushing or pulling a workpiece gripped by the pliers in the direction perpendicular to the pointing direction of the pliers, and a fixed jaw with hammer head.

2. Description of the Related Art

Pulling pliers have been used in the field of automotive repairing and wood working industries. The pliers are used to pull alignment pins out of engine blocks, a bolt out of the corroded hole, cotter pins, broken drill bits, nails from the wall, staples from a piece of wood, etc. There are various designs of the pulling pliers in the field, such as: Traction Applying Tool, U.S. Pat. No. 3,791,012; Locking Plier and Adapter, U.S. Pat. No. 4,307,635; Extraction Device, U.S. Pat. No. 4,669,341; Tool for Extracting Headed Nails, U.S. Pat. No. 5,984,272; Aluminum Window Frame Extractor and Method, U.S. Pat. No. 7,168,144; and Pulling Pliers Method and Apparatus, U.S. Pat. No. 8,407,874. However, all of these prior arts are used to pull out in one direction only, not the opposite direction (to push in). On the other hand, the direction of pulling of all these prior arts are in-line with (parallel to) the pointing direction of the pliers. That means there must be enough space above or in front of the workpiece to fit the pliers and the sliding hammer mechanism. In case the workpiece is located inside a recessed area where there is not enough space to fit the pliers and the sliding hammer mechanism above or in front of the workpiece, then the direction of hammering force will not align with the pulling direction of the workpiece. In this case, the hammering action of these prior arts may not be strong enough or may not be possible to pull out the workpiece. Furthermore, in order to pull out a workpiece with all these prior arts, the workpiece must be clamped at its free end. In the case of a long tube or long pipe where its free end cannot be reached, these prior arts will not be applicable. It is the intention of the present invention to solve these problems.

SUMMARY OF THE INVENTION

The present invention comprises a conventional locking pliers or vise grip, a fixed jaw equipped with a hammer head containing five hammering surfaces, and a slidable hammer assembly attached to either side of a threaded hole on the fixed jaw of the locking pliers. The slidable hammer assembly comprises a long straight rod with a hand-grip cylindrical hammer slidable between two stops on the rod, one at each end. One end of the straight rod is equipped with screw thread so that the rod can be screwed into the threaded hole on the fixed jaw. In order to pull a workpiece, such as a cotter pin, or a nail, etc. from its base in a recess area, the present invention can be used to grip the workpiece sideways with the jaws. That means, the pointing direction of the pliers is at 90 degrees to the direction of pulling. Attach the slidable hammer assembly to one side of the threaded hole of the fixed jaw of the locking pliers so that the straight rod is aligned with the pulling direction. While holding the locking pliers with one hand, grip the hand-grip cylindrical hammer with the other hand and slide it up and down the rod to create a hammering action in the pulling direction only. Then the workpiece can be pulled out of the base. To hammer the workpiece into the base, one can change the hammering action to the pushing direction instead of the pulling direction.

In the case of pulling a long pipe out of an object, a wall or another pipe, etc. it may not be possible to grip the free end of the long pipe with a locking plier. With the present invention, one can use it to grip the body of the pipe at the end close to the object. Attach the slidable hammer assembly to the fixed jaw, and hammer the pipe out of the object with the sliding action of the hammer. In the opposite, pushing the pipe to an object is also possible with the present invention by reversing the hammering action of the slidable hammer assembly.

The fixed jaw of the present invention is made to have a hammer head with five hammering surfaces. In some applications, instead of gripping the workpiece with the movable jaw and fixed jaw, the present invention can be used to push in a workpiece, such as a nail to a piece of wood with the hammer head on the fixed jaw; or to pull out a workpiece, such as a key from a groove of an object with the hammer head.

The slidable hammer assembly can be unscrewed from the body of the present invention so that the present invention can be used as a conventional locking pliers and as a conventional hammer using the hammer head of the fixed jaw.

DETAILED DESCRIPTION OF THE INVENTION

With the help of the drawings and the detail description below, the features of the present invention will be apparent and fully understandable.

Figure 1:
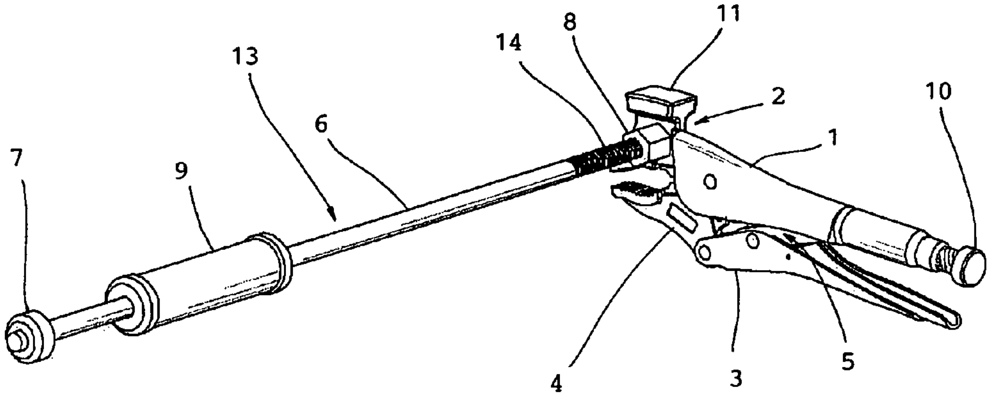
FIG. 1 is a perspective view of the present invention.
Figure 4:
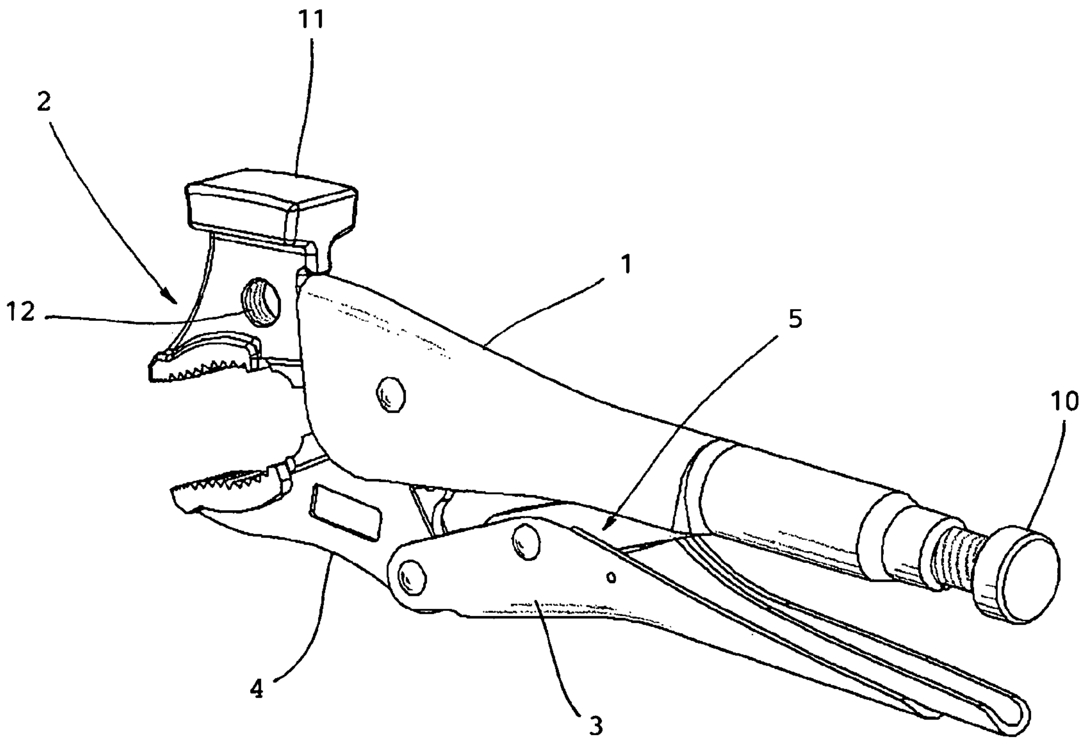
FIG. 4 is a perspective view of the present invention with the slidable hammer assembly removed.

Referring to FIG. 1 and FIG. 4, the present invention comprises a fixed handle 1 to which a fixed jaw 2 is attached, a movable handle 3 to which a movable jaw 4 is pivotally mounted, and a slidable hammer assembly 13. The fixed handle 1 is connected to the movable handle 3 with the toggling linkage mechanism 5 and the movable jaw 4 through pivots and spring the same way as a conventional locking pliers. The free end of the fixed handle 1 is cylindrical in shape and threaded internally to accept the adjustment screw 10 for the adjustment of the clamping gap and clamping force of the present invention. A threaded hole 12 is made on the body of the fixed jaw 2 at a location closer to the fixed handle 1. The slidable hammer assembly 13 comprises of a long straight rod 6 with metal stops 7 and 8 located at each end and a hand-grip cylindrical hammer 9 slidable over the straight rod 6. One end of the straight rod 6 is equipped with screw threads 14 so that the slidable hammer assembly 13 can be screwed into threaded hole 12 from either side of the body of fixed jaw 2. Fixed jaw 2 is made to have a T-shape cross section to form a hammer head 11 on the top of it so that the hammer head 11 has five hammering surfaces. This feature enables the present invention to act as a hammer besides a push-pull pliers.

Figure 2:
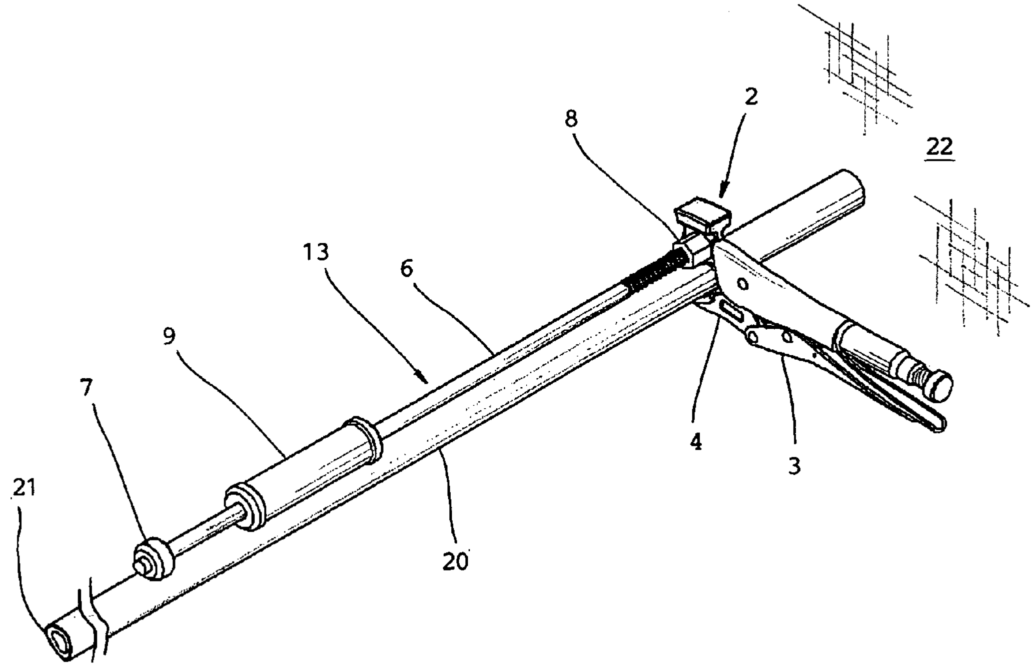
FIG. 2 is a perspective view of the present invention clamping a long pipe.

FIG. 2 shows the present invention clamping a long pipe 20 inserted to the base 22. The pipe 20 is long so that gripping at its free end 21 is not possible. However, the present invention can be used to clamp the body of long pipe 20 at a location close to the base 22. Then the long pipe 20 will be hammered out of the base 22 by sliding the hand-grip cylindrical hammer 9 over the straight rod 6 hitting metal stop 7 multiple times. With the present invention, the long pipe 20 can be hammered into base 22 by sliding the hand-grip cylindrical hammer 9 over the straight rod 6 hitting metal stop 8 multiple times.

Figure 3:
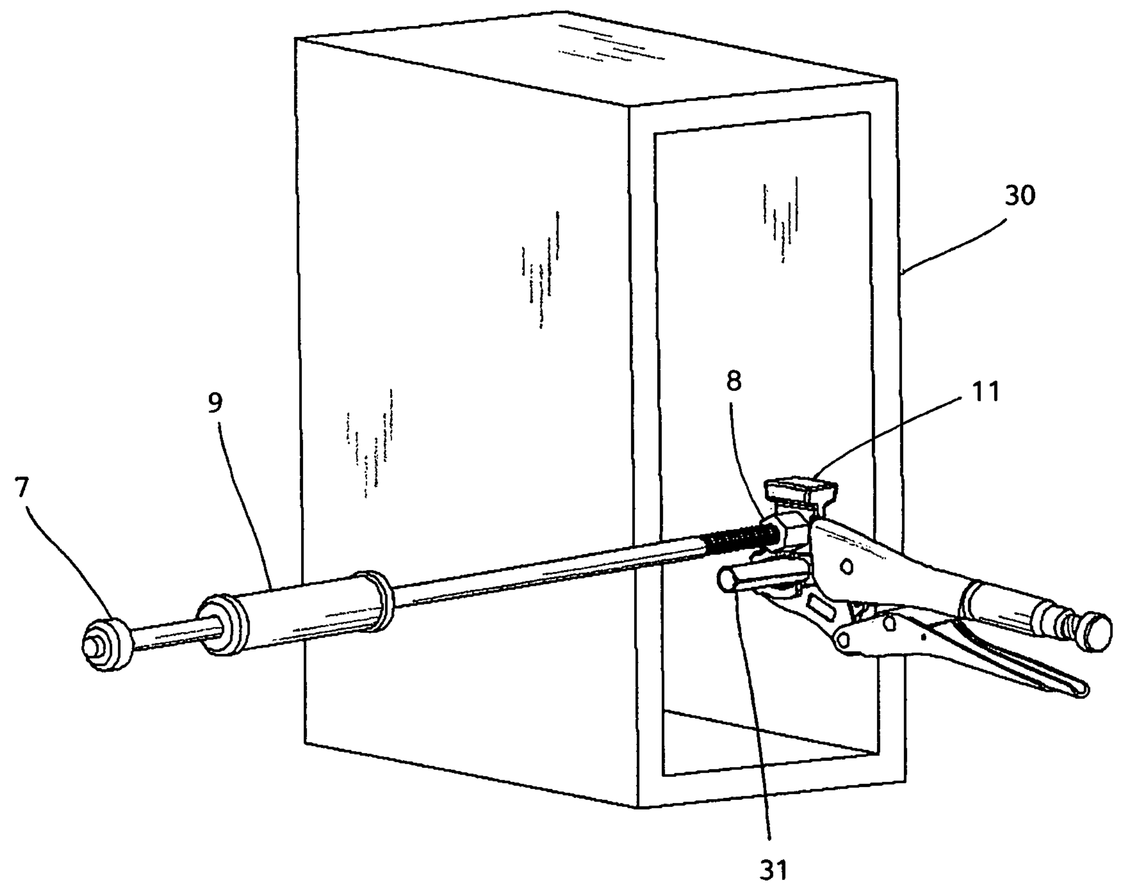
FIG. 3 is a perspective view of the present invention clamping a cotter pin under an environment of limited space.

Referring to FIG. 3, the present invention is used to pull out a cotter pin 31 which is located inside a small box 30. The space inside box 30 is limited so that it is hard to grip the cotter pin 31 at its free end. Hence the present invention is used to grip the body of cotter pin 31 from outside of box 30 and pull cotter pin 31 out of box 30 by the hammering action of hand-grip cylindrical hammer 9 sliding against metal stop 7.

Figure 5:
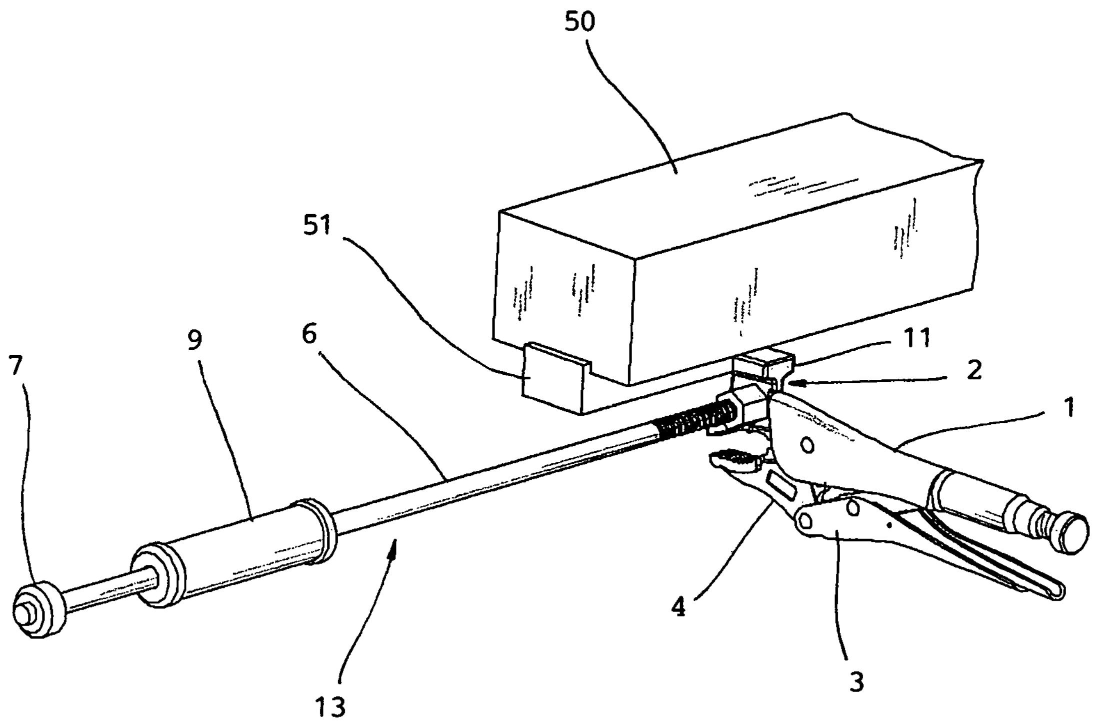
FIG. 5 is a perspective view of the present invention pulling a key out of a block with one hammering surface of the hammer head.

With reference to FIG. 5, the present invention is used to pull a key 51 out of the groove of block 50 by one of the five hammering surfaces of hammer head 11 of fixed jaw 2. The pushing force of hammer head 11 on the back of key 51 is more solid and positive than gripping key 51 by the fixed jaw 2 and movable jaw 4 of the present invention. This design feature also enables the present invention to hammer a workpiece into an object with hammer head 11.

As shown in FIG. 4, the present invention can be used as a conventional locking pliers or a conventional hammer with the slidable hammer assembly 13 removed from the fixed jaw 2.

What I claim as my invention is:

1. A push-pull pliers with hammers having a fixed handle and a movable handle linked together by a spring and a toggling linkage mechanism comprising:

- a movable jaw;
- a fixed jaw with a rectangular hammer head having five hammering surfaces, one on a top surface and one on each remaining four sides;
- a threaded hole formed in a body of said fixed jaw;
- a straight rod having a distal end having a first metal stop attached thereto and a proximal end that is threaded;
- a second metal stop threadedly engages said proximal end of said straight rod; and
- a hand-grip cylindrical hammer having flanges at each end slidable on said straight rod between said first metal stop and said second metal stop.

2. The push-pull pliers with hammers according to claim 1, wherein said threaded hole is located as close to said fixed handle as possible.

3. The push-pull pliers with hammers according to claim 1, wherein said straight rod threadedly engages said threaded hole of said fixed jaw.

4. The push-pull pliers with hammers according to claim 1, wherein said body of said fixed jaw comprises two flat surfaces, a front flat surface and a rear flat surface.

5. The push-pull pliers with hammers according to claim 4, wherein an axis of said straight rod is perpendicular to either said flat surfaces of said body of said fixed jaw.

6. The push-pull pliers with hammers according to claim 1, wherein said first metal stop, when hit by said hand-grip cylindrical hammer, serves as means to apply pulling force to a workpiece clamped by said push-pull pliers; and said second metal stop, when hit by said hand-grip cylindrical hammer, serves as means to apply pushing force to said workpiece clamped by said push-pull pliers.

* * * * *